US008545246B2

(12) United States Patent
Myers et al.

(10) Patent No.: US 8,545,246 B2
(45) Date of Patent: Oct. 1, 2013

(54) HIGH CONNECTIVITY PLATFORM (75) Inventors: Gary L. Myers, Morgan Hill, CA (US);
Kamran Esmaily, Sunnyvale, CA (US);
Upendranadh Reddy Kareti, Union City, CA (US); Phillip S. Ting, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 88 days.

(21) Appl. No.: 13/346,079

(22) Filed: Jan. 9, 2012

(65) Prior Publication Data

US 2013/0029532 A1    Jan. 31, 2013

Related U.S. Application Data (60) Provisional application No. 61/511,492, filed on Jul. 25, 2011.

(51) Int. Cl.
*H01R 33/94*    (2006.01)

(52) U.S. Cl.
USPC ............ 439/247; 439/638; 439/65; 370/389; 370/419; 370/351

(58) Field of Classification Search
USPC ................. 370/389, 419, 351, 225, 216, 227, 370/356, 392, 401, 366, 412, 391, 384, 386, 370/387; 439/247, 248, 638, 65, 62; 709/225, 709/238, 250; 361/730, 736, 752, 788; 398/164, 135, 128
See application file for complete search history.

(56) References Cited

U.S. PATENT DOCUMENTS

| | | | |
|---|---|---|---|
| 4,934,943 A * | 6/1990 | Klein et al. ................. 439/65 |
| 5,991,295 A | 11/1999 | Tout et al. | |
| 6,030,242 A * | 2/2000 | Cunningham et al. ........ 439/247 |
| 6,216,167 B1 | 4/2001 | Momirov | |
| 6,484,209 B1 | 11/2002 | Momirov | |
| 6,603,771 B1 | 8/2003 | Raza | |
| 6,876,652 B1 | 4/2005 | Bell et al. | |
| 6,931,211 B2 * | 8/2005 | English et al. ............... 398/164 |
| 7,023,845 B1 * | 4/2006 | Simons et al. .............. 370/389 |
| 7,031,330 B1 | 4/2006 | Bianchini, Jr. | |
| 7,039,046 B1 | 5/2006 | Simons et al. | |
| 7,274,696 B1 * | 9/2007 | Sikdar ........................ 370/391 |
| 7,277,425 B1 * | 10/2007 | Sikdar ........................ 370/366 |
| 7,406,083 B2 * | 7/2008 | Dittmann et al. ............ 370/394 |
| 7,466,704 B2 | 12/2008 | Kalkunte et al. | |
| 7,500,862 B1 * | 3/2009 | Herring et al. ............... 439/246 |
| 7,695,298 B2 * | 4/2010 | Arndt et al. .................. 439/165 |
| 7,699,649 B2 * | 4/2010 | Busse ........................ 439/550 |

(Continued)

OTHER PUBLICATIONS

Wethington et al., U.S. Appl. No. 13/543,468 Patent application "System and Method for High Connectivity Platform" filed Jul. 6, 2012.

*Primary Examiner* — Gary F. Paumen
(74) *Attorney, Agent, or Firm* — Baker Botts L.L.P.

(57) ABSTRACT

An apparatus, in accordance with particular embodiments, includes a shell comprising two substantially parallel surfaces. The apparatus further includes a plurality of connector housings mounted between the two substantially parallel surfaces. The apparatus also includes a plurality of connectors coupled to the plurality of connector housings. Each connector is configured to move along at least one axis within its respective connector housing. The apparatus further includes a plurality of cables. Each cable is configured to couple together at least two connectors. The plurality of cables are arranged between the two substantially parallel surfaces.

20 Claims, 7 Drawing Sheets

(56) References Cited

U.S. PATENT DOCUMENTS

| | | | |
|---|---|---|---|
| 7,892,001 B2* | 2/2011 | Hanyu | 439/247 |
| 7,978,690 B2 | 7/2011 | Abel et al. | |
| 2003/0039014 A1* | 2/2003 | English | 359/163 |
| 2006/0073723 A1* | 4/2006 | Cowgill et al. | 439/247 |
| 2008/0057764 A1* | 3/2008 | Kuo | 439/248 |
| 2008/0274634 A1* | 11/2008 | Kabasawa et al. | 439/247 |

* cited by examiner

HIGH CONNECTIVITY PLATFORM

CROSS-REFERENCE TO RELATED APPLICATION

This application claims priority under 35 U.S.C. §119(e) to U.S. Provisional Application Ser. No. 61/511,492 filed Jul. 25, 2011, entitled "System and Method for High Connectivity Platform," which is hereby incorporated by reference in its entirety.

TECHNICAL FIELD

The present disclosure relates generally to high connectivity platforms.

BACKGROUND

The increasing channel density and data rates used by switching and/or routing platforms has resulted in a corresponding increase in both the number of switch fabric channels (e.g., Serializer/Deserializer ("SerDes") channels) and the operating frequency within the platform. This increase has made it harder to provide the desired connector density, signal integrity, and thermal cooling within the platform. One way to solve the connectivity problems is to increase the number of backplane routing layers used to connect the port cards with the switch-fabric cards. However, the increased pin density of the backplane connectors has negated some of the routing improvements and causes signal integrity issues at higher frequencies due to the increased distance data has to travel to route around other connectors.

To mitigate issues with routing in a backplane, some platforms are designed such that the cards are directly connected together orthogonally to each other. The direct connection between the cards avoids routing in the backplane but limits the number of port cards that can be used based on the size that a printed circuit board (PCB) can be manufactured for the switch-fabric cards. The orthogonal architecture also has thermal constraints due to the limited airflow for cooling. Optimum front to rear airflow can not be achieved in part because there are limited open areas through which the air is able to flow. In addition, the air that does flow to the switch-fabric cards is at least partially pre-heated by the port cards, or vice-versa. This thermal constraint may further limit the maximum component density on a card.

BRIEF DESCRIPTION OF THE FIGURES

For a more complete understanding of particular embodiments and their advantages, reference is now made to the following description, taken in conjunction with the accompanying drawings, in which.

DESCRIPTION OF EXAMPLE EMBODIMENTS

Overview

An apparatus, in accordance with particular embodiments, includes a shell comprising two substantially parallel surfaces. The apparatus further includes a plurality of connector housings mounted between the two substantially parallel surfaces. The apparatus also includes a plurality of connectors coupled to the plurality of connector housings. Each connector is configured to move along at least one axis within its respective connector housing. The apparatus further includes a plurality of cables. Each cable is configured to couple together at least two connectors. The plurality of cables is arranged between the two substantially parallel surfaces.

Example Embodiments

Figure 1A:
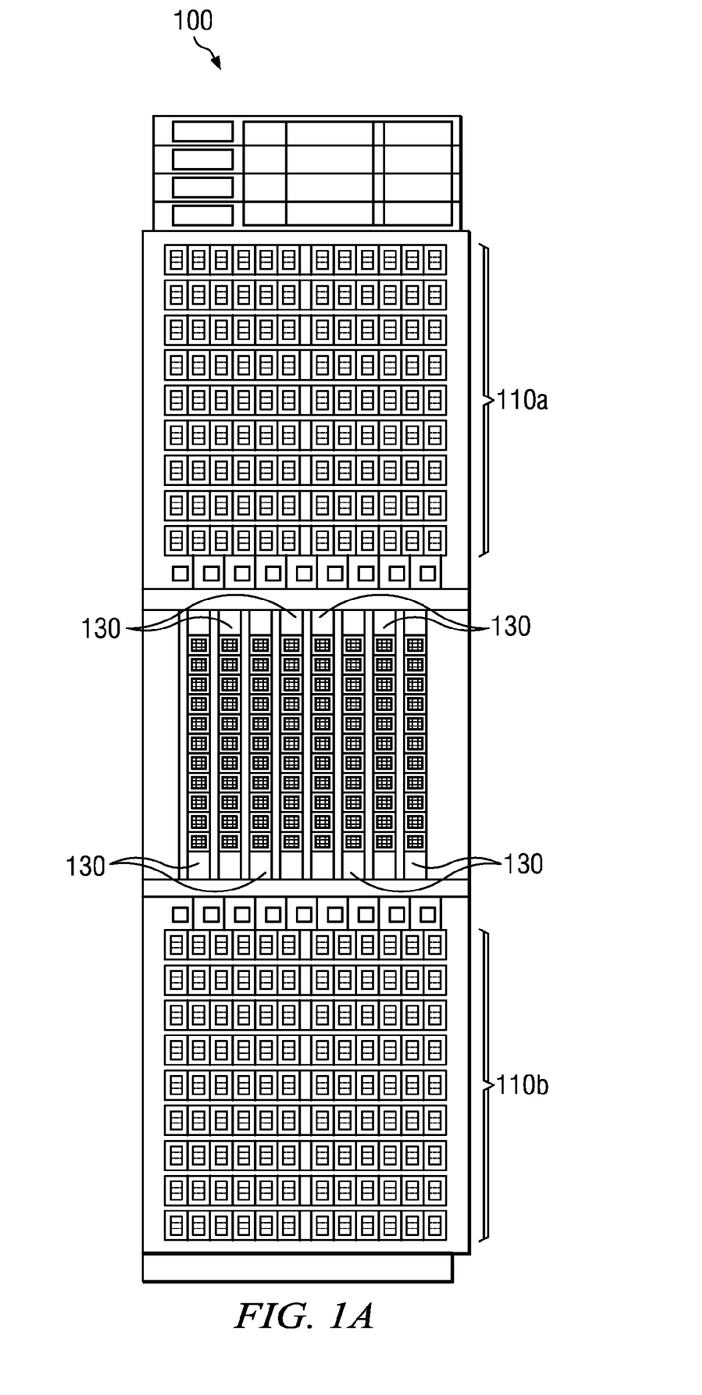
FIGS. 1A and 1B illustrate a front view and a side view of an enclosure in which a plurality of port cards are coupled to a plurality of switch-fabric cards via a plurality of bridge cards, in accordance with particular embodiments.
Figure 1B:
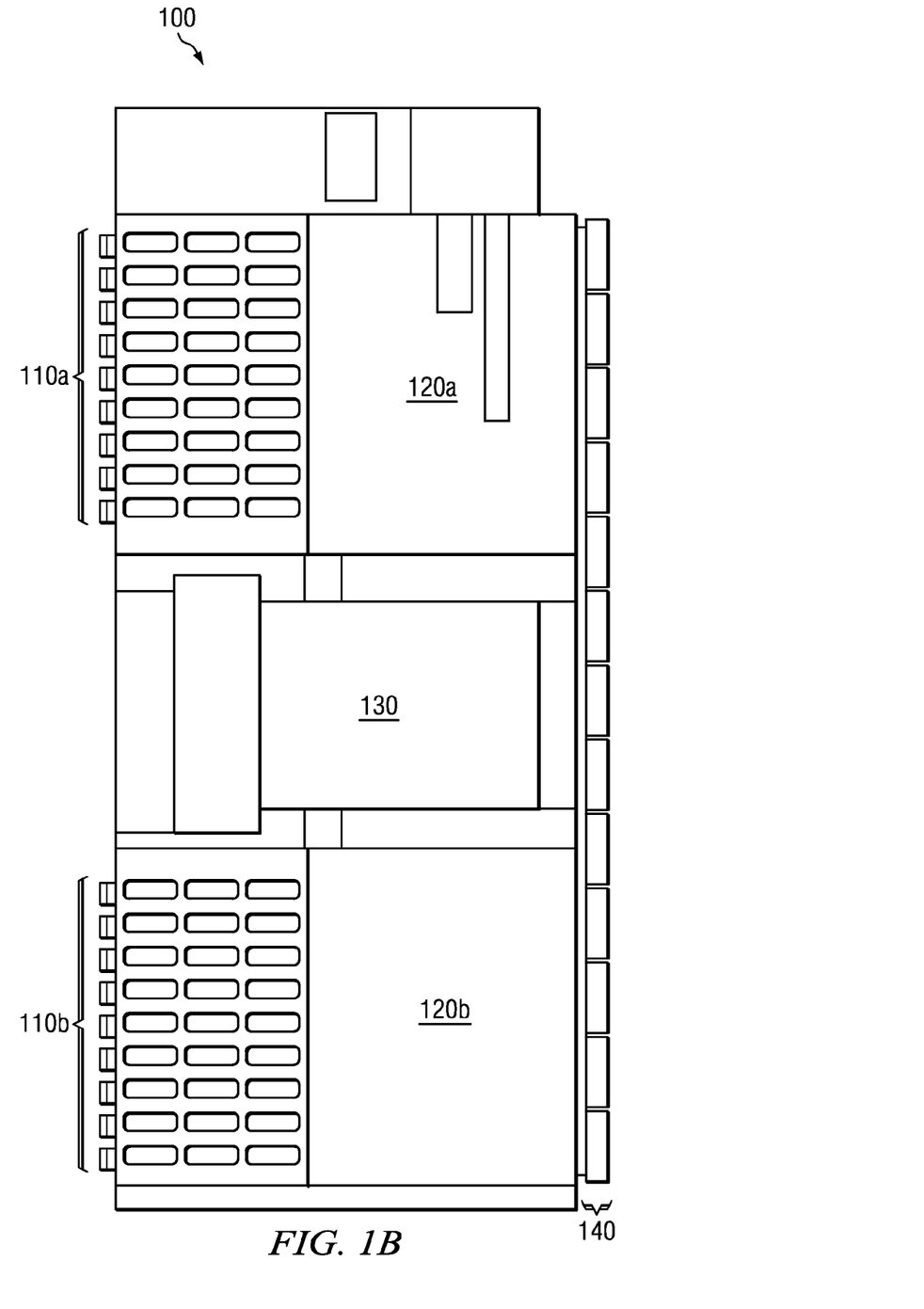

FIGS. 1A and 1B illustrate a front view and a side view of an enclosure in which a plurality of port cards are coupled to a plurality of switch-fabric cards via a plurality of bridge cards, in accordance with particular embodiments. Enclosure 100 may comprise components for a router or switch platform architecture (hereinafter simply "platform") that maximizes the number of port cards and the number of channel interconnections, minimizes channel lengths, improves the effectiveness of front-to-rear air flow for cooling, and alleviates certain mechanical issues. As depicted, enclosure 100 comprises upper port cards 110a and lower port cards 110b (collectively, port cards 110) coupled to switch-fabric cards 130 via upper bridge cards 120a and lower bridge cards 120b, respectively, (collectively bridge cards 120).

As used herein, the term port card is used to generally refer to any card, circuit board, or component of a platform that may comprise ports, connectors, jacks, or other connection interfaces for external components or connections. For example, port cards may include port interface cards, external port cards, connector cards, etc. As used herein, the term switch-fabric card is used to generally refer to any card, circuit board, or component of a platform that may provide switching or switch fabric functionality. For example, switch-fabric cards may include switching-fabric modules, switching-fabrics, etc.

In certain embodiments and/or scenarios, enclosure 100 may be configured with "N" port cards 110 arranged as a series in the top section of the chassis and a series in the bottom section of the chassis. Between the two sections of port cards 110 there may be "M" switch-fabric cards 130. In the rear of the chassis there may be "M" bridge cards 120. Each bridge card 120 may be a three-dimensional, high density, interconnect that provides electrical connections between port cards 110 and switch-fabric cards 130. Bridge cards 120 may extend from switch-fabric cards 130 to the top or bottom of enclosure 100 such that any port card 110 inserted into enclosure 100 may be connected to one or more bridge cards 120. In some embodiments, bridge cards 120 may be split and/or segmented.

Within enclosure 100, port cards 110 may be arranged orthogonally to switch-fabric cards 130. For example, in the depicted embodiment, port cards 110 are arranged vertically and switch-fabric cards 130 are arranged horizontally. However, unlike the orthogonal architecture of directly connected cards, port cards 110 and switch-fabric cards 130 are separated vertically such that air flowing through enclosure 100, for example from the front to the back, only passes over one or the other set of the cards, not both. Switch-fabric cards 130 may be positioned between upper port cards 110a and lower port cards 110b. Port cards 110 and switch-fabric cards 130 are positioned within enclosure 100 such that the cards do not vertically overlap with one-another. This may better facilitate cooling of the cards using air moving from the front to the back of enclosure 100. In particular, the air is not pre-heated by one of the cards before passing over another of the cards.

Bridge cards 120 may interconnect port cards 110 and switch-fabric cards 130. Bridge cards 120 may effectively create a three dimensional midplane or backplane. In some embodiments, bridge cards 120 may be aligned with switch-fabric cards 130. In such embodiments, each bridge card 120 may be associated with any number of port cards 110 but only one switch-fabric card 130. In certain embodiments, unlike current platform architectures were in order to increase interconnect resources you need to add PCB routing layers, bridge card 120 may provide for increases in interconnect resources by increasing the depth (from the front to the back of platform 100) and/or height of bridge cards 120. For a traditional midplane or backplane, as the depth increases, so to does the technological difficulty and/or financial costs such that there is a limit to the depth that can practically be achieved.

In certain embodiments, bridge cards 120 may be fixed, attached, or otherwise coupled to enclosure 100. In some embodiments, bridge cards 120 may help to minimize and/or eliminate mechanical registration issues. For example, there may not be a need to align the connectors of a port card with the connectors of a switch-fabric card as there is with directly connected cards. In particular embodiments, the switch fabric channels of enclosure 100 may be partitioned into N fabric domains. In such an embodiment, each switch-fabric card 130 may provide services for a subset of the fabric domains. Connectivity between port cards 110 for a subset of fabric domains may be provided by bridge cards 120. Fabric inter-domain connectivity may be performed within port cards 110.

In certain embodiments, bridge cards 120 may be aligned with the direction of airflow (e.g., front to back) and may provide minimal impedance to the flow of air through enclosure 100. In particular, the large, flat, parallel surfaces of bridge cards 120 may allow air to flow freely through the spaces between individual bridge cards 120. In some embodiments, bridge cards 120 may be physically shaped and placed so as to improve the flow of air through enclosure 100. For example, bridge cards 120 may provide a venturi effect to the air flowing through enclosure 100.

In some embodiments, enclosure 100 may comprise active cards between port cards 110 and switch-fabric cards 130. In particular embodiments, enclosure 100 may comprise an architecture that provides a high number of channel interconnects (e.g., more than 1000) between port cards 110 and switch-fabric cards 130. For example, in some embodiments, each bridge card 120 within enclosure 100 may comprise at least 1,568 (e.g., 784 different pairs of connections). As another example, in certain embodiments each bridge card may comprise at least 18,816 interconnects (e.g., 9,408 different pairs of connections). The number of interconnects supported by enclosure 100 may be the number of bridge cards 120 (e.g., 16 bridge cards) multiplied by the number of interconnects supported by each bridge card (e.g., 1568, 18,816).

The high number of interconnects may be achieved, in part, through bridge cards 120. Bridge cards 120 may be used to effectively create a three dimensional interconnect architecture that maximizes the openings for airflow in enclosure 100. In particular embodiments, bridge cards 120 may allow enclosure 100 to have port cards 110 and switch-fabric cards 130 installed in the front end of an enclosure, without any overlap (e.g., front to back) between the cards. This may allow both sets of cards to received fresh air (e.g., air that is not preheated by other cards). The improved cooling, and improved air flow, may allow enclosure 100 to accommodate port cards and/or switch-fabric cards with a higher thermal density.

Depending on the scenario and/or operational needs, bridge cards 120 may include cables within a shaped housing or shell, a PCB, or any other configuration. The shell or PCB of bridge card 120 may be shaped to connect the various port cards 110 and switch-fabric cards 130 together. Bridge cards 120 may further be shaped to improve the flow of air through enclosure 100. For example, bridge cards 120 may be shaped so as to smooth the airflow passing through enclosure 100 (e.g., providing a venturi effect, etc.).

In certain embodiments, the cables within bridge cards 120 may comprise fiber optic cables, twin-ax cables, coax cables, twisted pair cables, or any other suitable cabling that may allow bridge cards 120 to maximize the possible number of interconnects, operate at higher channel frequencies, and improve signal integrity. The shell of bridge cards 120 may help to keep these cables organized.

In certain embodiments, the physical configuration of bridge card 120 may allow true front to back airflow (e.g., air enters the front of enclosure 100, flows over port cards 110 or switch-fabric cards 130, and exits the rear of enclosure 100). In some embodiments, the airflow may be provided by fans 140 located along the back of enclosure 100.

In particular embodiments, bridge cards 120 may allow for manufacturing tolerances in the enclosure 100, port cards 110, switch-fabric cards 130, and/or any other components that may impact the alignment and/or location of the connectors on port cards 110 and/or switch-fabric cards 130. The manufacturing tolerances may be accommodated without compromising the electrical interconnects. Bridge cards 120 may do this while also minimizing their impedance on the airflow through enclosure 100. In certain embodiments, the manufacturing tolerances may be accommodated by a floating set of connectors. The floating connects may allow movement in one or two directions tangential or parallel to the corresponding edge of bridge card 120 while resisting movement in the third direction into bridge card 120.

In certain embodiments, port cards 110 and switch-fabric cards 130 may comprise fixed connectors. Although port cards 110 are depicted as being inserted into enclosure 100 in a horizontal fashion and switch-fabric cards 130 are depicted as being inserted in a vertical fashion, in other instances port cards 110 may be inserted in a vertical fashion and switch-fabric cards 130 may be inserted in a horizontal fashion. In certain embodiments, the same bridge cards 120 may be used with either orientation, in other embodiments, different bridge cards 120 may be used for the different orientations. In particular embodiments, bridge card 120 may comprise corresponding connectors regardless of the type or orientation of bridge card 120 and/or type or orientation of port cards 110 and/or switch-fabric cards 130.

In some embodiments, enclosure 100 may comprise an actuation mechanism at the front of enclosure 100. The actuation mechanism may, for example, allow an operator to easily rotate a lever to move the floating connectors of bridge card 120 up or down and/or left or right to engage the corresponding connector/connectors of port cards 110 and/or switch-fabric cards 130. Some embodiments may also include a mechanical lock that may be overridden when a switch-fabric card 130 or port card 110 is inserted or removed. For example, inserting a switch-fabric card 130 may move a latch that allows actuation of the connector. This feature may protect the connectors from damage from moving before the card has been inserted. In some instances, the actuator may also have an emergency override that allows the unmating of the connector in the event that the standard lock lever was to fail.

In the depicted embodiments, switch-fabric card 130 and bridge cards 120 are arranged in-line with one another and orthogonal to port cards 110. This may allow each switch-fabric card 130 to be engaged and mated to all port cards 110 within the chassis through a single corresponding bridge card 120.

Although a particular embodiment is depicted, bridge cards 120 may be used in any type of switching or routing platform. For example, bridge cards 120 may be used for a switch platform that may use a relatively high number of channels and/or high channel frequencies. Certain embodiments may be particularly suited for platforms where entry of cooling air is distributed across the entire front of the platform, and exhaust air exiting the platform is distributed across the rear of the platform. Other airflow configurations may also be possible with this architecture (e.g., top to bottom).

Figure 2A:
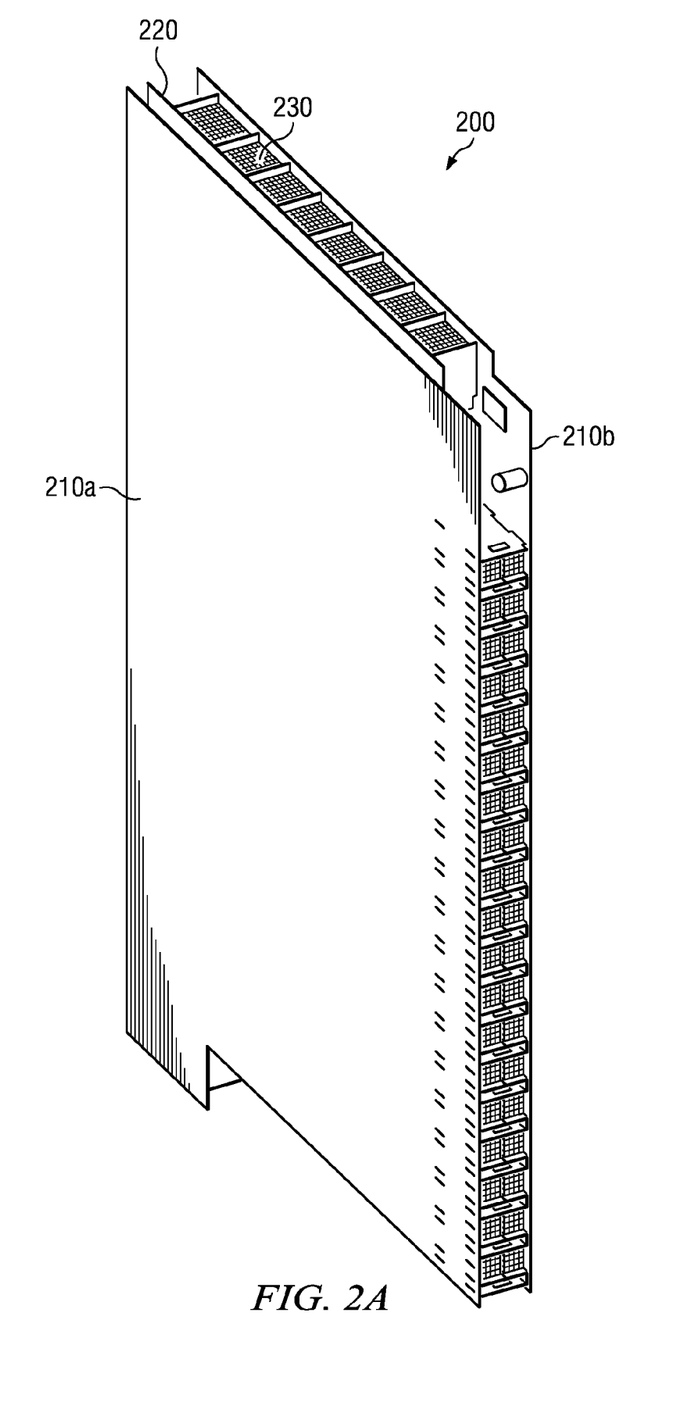
FIG. 2A illustrates an assembled bridge card, in accordance with particular embodiments.

FIG. 2A illustrates an assembled bridge card, in accordance with particular embodiments. Bridge card 200 may be a three-dimensional electrical interconnect between any pluggable cards (e.g., port cards 110 and switch-fabric cards 130) within a chassis or enclosure (e.g., enclosure 100). Bridge card 200 may be one of several bridge cards used within the same enclosure.

In some embodiments, each bridge card 200 may comprise a shell formed from parallel surfaces 210a and 210b. The shell may protect and organize a plurality of cables used to interconnect the different pluggable cards. Parallel surfaces 210 may also provide a smooth surface allowing any cooling air to flow easily around bridge card 200. In some embodiments, parallel surfaces 210 may be coupled together via, for example, screws (e.g., screw 350 depicted in FIG. 3), or other fasteners. By releasing the fasteners, at least one parallel surface 210 may be removed to expose the cables within bridge card 200.

Between parallel surfaces 210, along two of the edges, bridge card 200 may support a plurality of connector housings 220. In other embodiments, connector housings 220 may only be mounted along one edge, or they may be mounted along three edges. Each connector housing 220 may have its own respective floating connector 230. Connectors 230 may be able to move along one or more axes within their respective connector housing 220. The floating may include movement along axes tangential to the edge to which connectors 230 are housed, but may not include movement along an axis extending into bridge card 200 between parallel surfaces 210. The tangential movement may provide allowances for any misalignment between the pluggable cards and bridge card 200 that could occur due to variations in manufacturing. The rigidity of connectors 230 along the axis extending into bridge card 200 may provide a solid connector to which the pluggable cards may be connected. In some embodiments, connectors 230 may only move along a single axis. In some embodiments, connector housings 220 may float in one or more axis and connector 230 may be immobile or may float within connector housing 220. For example, connector housings 220 may float along a first axis, and connectors 230 may float along a second axis orthogonal to the first axis.

Figure 2B:
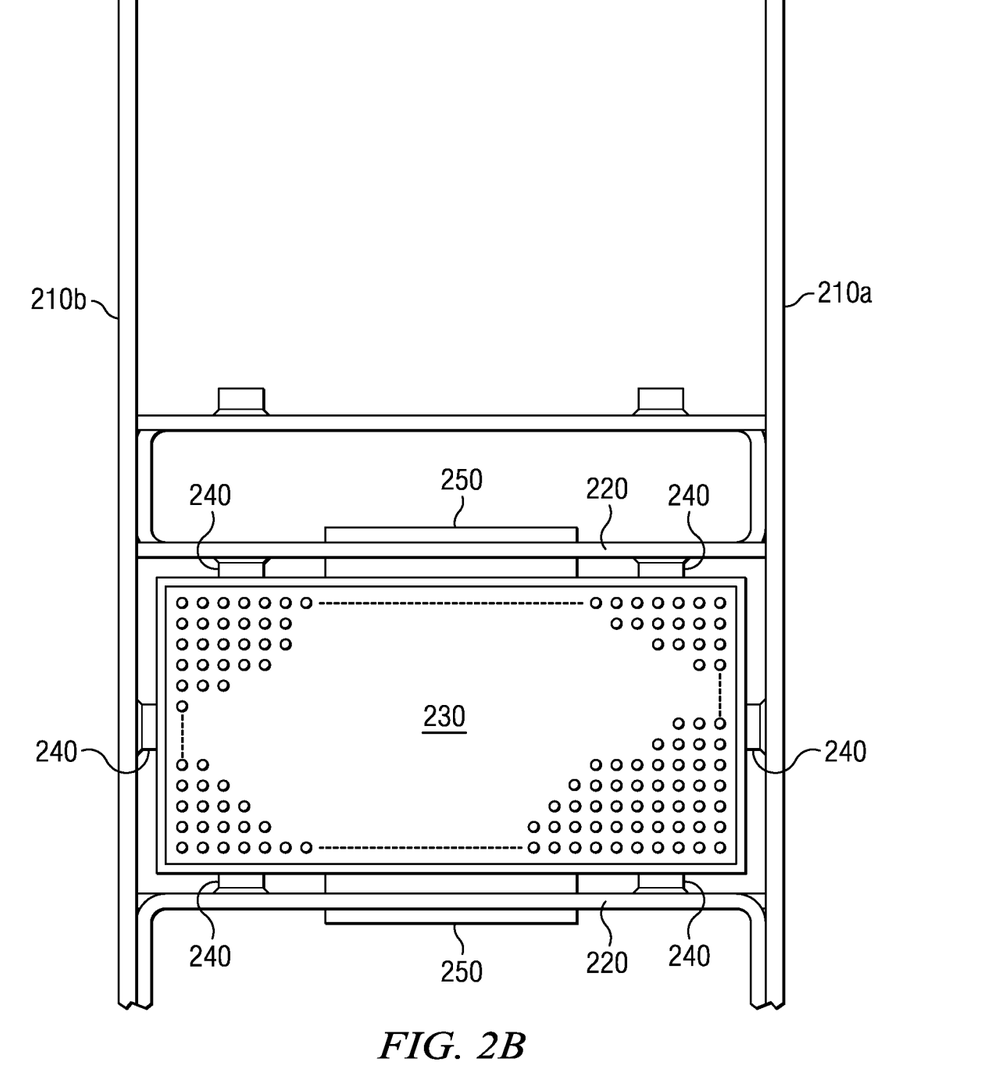
FIGS. 2B and 2C illustrate a magnified image of a connector and connector housing from the assembled bridge card depicted in FIG. 2A, in accordance with particular embodiments.
Figure 2C:
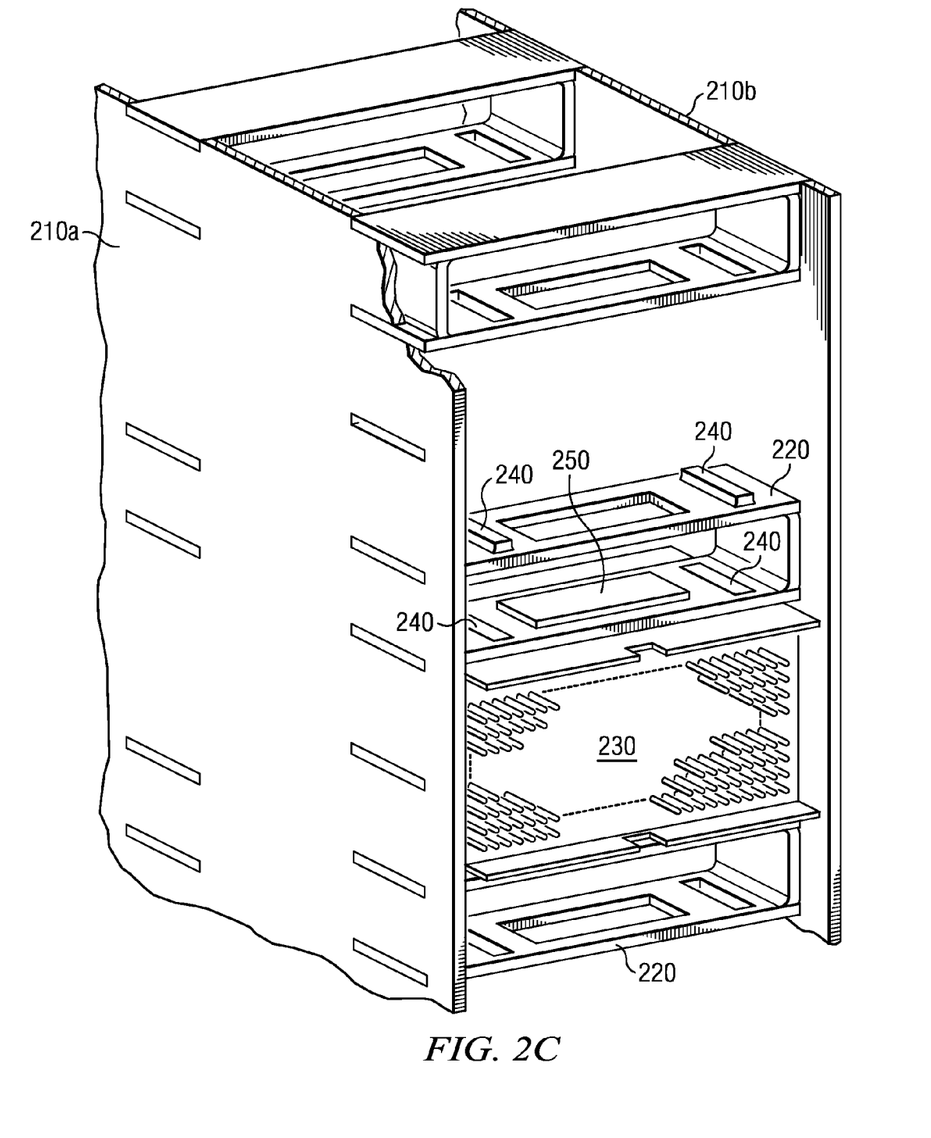

FIGS. 2B and 2C illustrate a magnified image of a connector and connector housing from the assembled bridge card depicted in FIG. 2A, in accordance with particular embodiments. In the depicted embodiment, connector 230 is mounted in connector housing 220. With respect to FIG. 2B, connector 230 is free to move left or right and up or down. This allows connector 230 to adjust to any alignment discrepancies. While the depicted embodiment includes a particular pin layout for connector 230, any other desired pin layout may be used.

In certain embodiments, connector 230 may be kept centered within connector housing 220 via one or more tensioners (e.g., springs, rubber bands, compressible rubber, encased gel, foam, etc.). For example, in the depicted embodiment, connector 230 may be spring loaded on four sides. Springs 240 may provide forces along the two axes of movement to help hold connector 230 in a center position while still allowing connector 230 to float within connector housing 220. This may provide additional protection for the cable terminations on the connectors by, for example, providing stress relief, eliminating/reducing the possibility of the connector buffeting in airflow or vibrating due to any vibration in the system caused by fans, etc.

In some instances, the amount of float of the floating connectors may be +/−2 mm in the X and Y directions (e.g., tangentially horizontal or vertical with respect to the edge of bridge card 200) and fixed in the connector mating, or Z, direction (e.g., into bridge card 200). In certain embodiments, the ability for connectors 230 to float may reduce and/or eliminate the challenge of connector binding and misalignment due to manufacturing tolerances in a high density interconnect. In certain embodiments, connector 230 may include tabs 250. Tabs 250 may resist movement in the Z direction while allowing movement in the X and Y directions.

Figure 3:
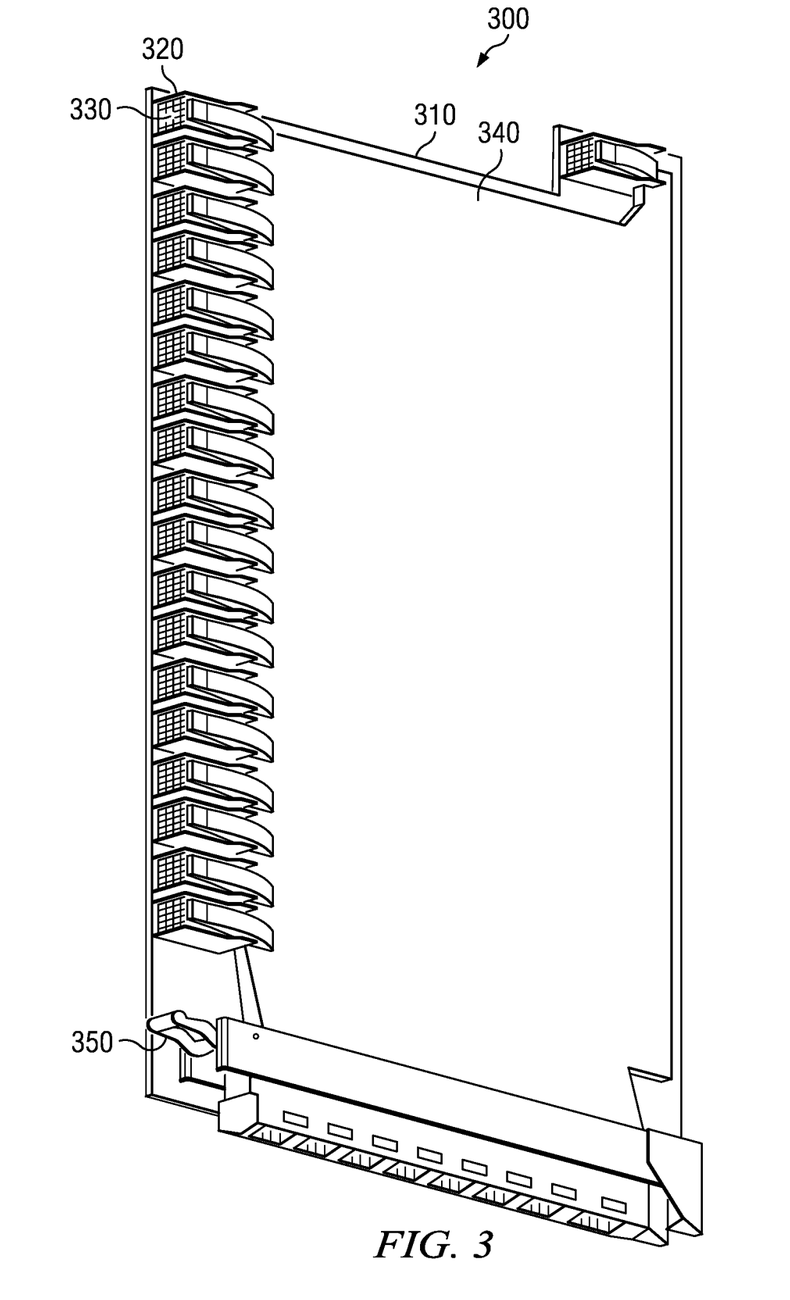
FIG. 3 illustrates a bridge card with one of two parallel surfaces removed from the bridge card, in accordance with particular embodiments.
Figure 4:
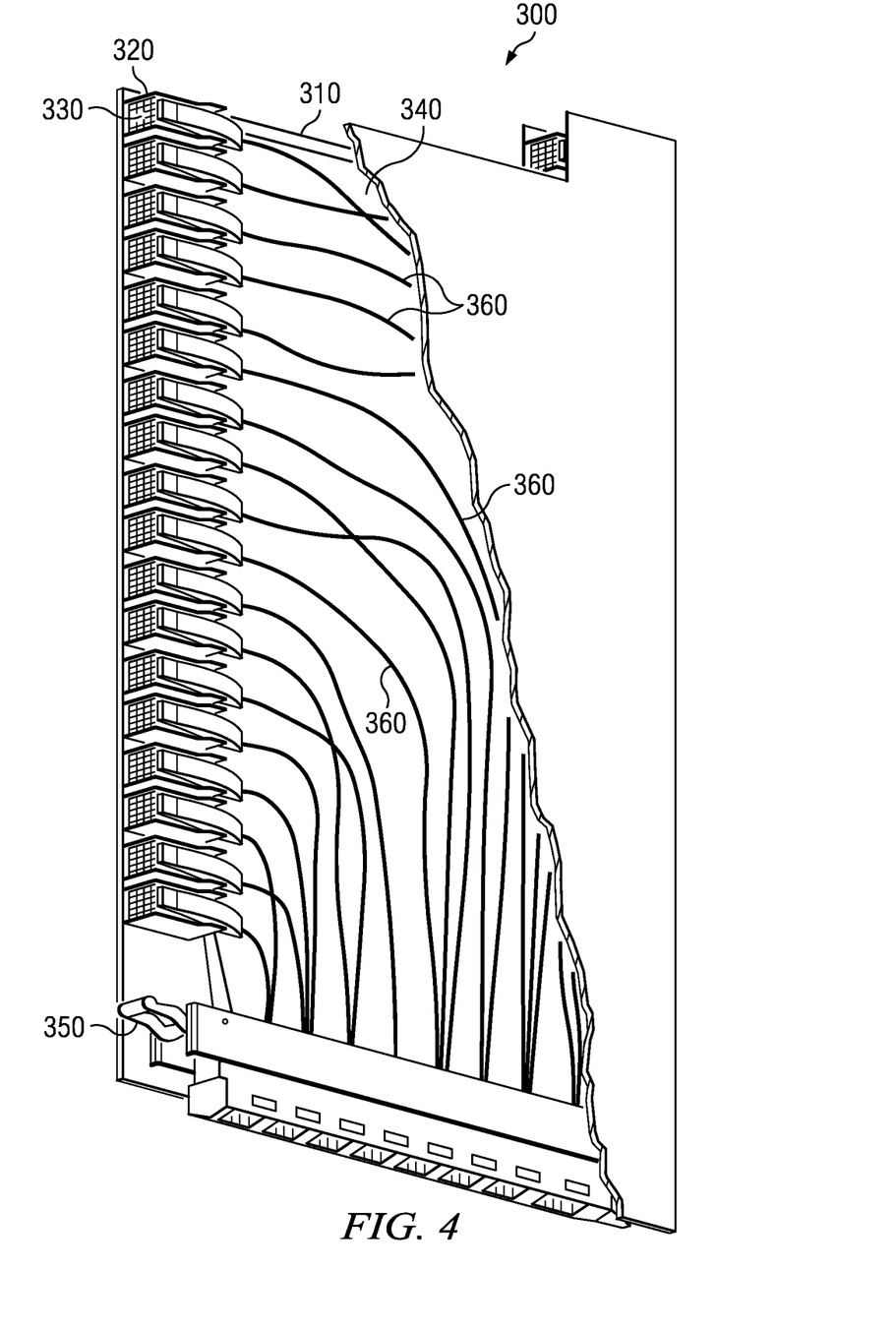
FIG. 4 illustrates the interior of a bridge card, in accordance with particular embodiments.

FIG. 3 illustrates a bridge card with one of two parallel surfaces removed from the bridge card, in accordance with particular embodiments. FIG. 4 illustrates the interior of a bridge card, in accordance with particular embodiments. For convenience, FIGS. 3 and 4 will be discussed together. A bridge card may comprise two parallel surfaces, in the depicted embodiment, one of the parallel surfaces of bridge card 300 has been removed, leaving only parallel surface 310. The parallel surfaces, including parallel surface 310, may comprise a metal or other similar rigid material. Connector housings 320 may be mounted to parallel surface 310.

Also attached to parallel surface 310 may be plastic tray 340. In some embodiments, plastic tray 340 may be easily detached from parallel surface 310. Plastic tray 340 may manage and/or organize a plurality of cables 360. In some embodiments, the thickness, or depth, of plastic tray 340 may correspond to the thickness, or diameter, of cables 360. Plastic tray 340 may keep cables 360 in a neat and organized fashion between the parallel surfaces of bridge card 300. By managing the cables within plastic tray 340, bridge card 300 may reduce or minimize airflow impedance of cables 360 (as compared to allowing the cables to be loose within the enclosure). In some embodiments, plastic tray 340 may include one or more cable guides that may be suitable for managing, or routing, cables 360 within plastic tray 340 and bridge card 340.

Cables 360 within plastic tray 340 connect various connectors 330 with one another. These cables 360 may include fiber optic cables, thin-ax cables, coaxial cables, twisted pair cables, or any other type of cable suitable for connecting two different types of pluggable cards (e.g., port cards and/or switch-fabric cards).

Technical advantages of particular embodiments may include providing an architecture in which bridge cards may be used to simplify and improve the routing on and between port cards and/or switch-fabric cards, reduce PCB layer counts, improve signal integrity, improve line length and line loss between port cards and switch-fabric cards, and optimize and organize interconnects for the fabric channels. Another technical advantage of particular embodiments may be that the architecture in which bridge cards are used may provide for true front-to-back airflow. Another technical advantage of particular embodiments may be that the floating connectors of the bridge card may accommodate manufacturing tolerances inherent in the chassis of the enclosure and in the cards that are engaged with the bridge cards. Other technical advantages will be readily apparent to one of ordinary skill in the art from the figures, descriptions, and claims provided herein. Moreover, while specific advantages have been enumerated above, various embodiments may include all, some, or none of the enumerated advantages.

Although particular embodiments have been described in detail, it should be understood that various other changes, substitutions, combinations and alterations may be made hereto without departing from the spirit and scope of the disclosure. For example, features and functionality discussed with respect to a particular figure, such as FIG. 1A or 1B, may be used in connection with features and functionality discussed with respect to another such figure, such as FIG. 2A, 2B, or 2C according to operational needs or desires. Particular embodiments may combine one or more features depending on operational needs and/or component limitations. This may allow for great adaptability to the needs of various organizations and users. Some embodiments may include additional features. It is intended that particular embodiments encompass all such changes, substitutions, variations, alterations and modifications as falling within the spirit and scope of the appended claims. In addition, any of the devices or elements disclosed herein may be provided as integrated internal or separate external components to each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims. For example, while the architecture depicted in FIGS. 1A and 1B shows port cards 110 and switch-fabric cards 130 arranged in a vertical stack, in certain embodiments the port cards and the switch-fabric cards may be arranged with one in front of the other, or there may be multiple vertical stacks of port cards 110 and/or switch-fabric cards 130.

What is claimed:

1. An apparatus comprising:
   one or more port cards arranged along a first orientation and located in at least a first portion of an enclosure;
   one or more switch-fabric cards arranged along a second orientation and located in at least a second portion of the enclosure, the second orientation orthogonal to the first orientation; and
   one or more bridge cards coupling the one or more port cards to the one or more switch-fabric cards, the one or more bridge cards arranged along a third orientation and located in a third portion of the enclosure, each bridge card comprising a plurality of connectors, each connector movable along at least one axis.

2. The system of claim 1, wherein the one or more port cards, one or more switch-fabric cards, and one or more bridge cards are arranged such that air is able to flow from a front-end of the enclosure to a back-end of the enclosure.

3. The system of claim 1, wherein each connector of the plurality of connectors are movable along at least two orthogonal axes.

4. The system of claim 1, wherein the plurality of connectors are immovable along at least one axis.

5. The system of claim 1, wherein each bridge card of the one or more bridge cards further comprises:
   a plurality of connector housings, each connector housing configured to house at least one of the plurality of connectors; and
   at least one tensioner for each of the plurality of connectors, the at least one tensioner configured to center each connector within a corresponding connector housing.

6. The system of claim 1, wherein each bridge card of the one or more bridge cards comprises a shell to which a plurality of connector housings are mounted, the connector housings mounted along at least two orthogonal edges of the shell.

7. The system of claim 6, wherein each bridge card of the one or more bridge cards comprises a plurality of cables, each cable configured to connect at least one connector housed in a connector housing mounted along a first edge of the at least two orthogonal edges of the shell with at least one connector housed in a connector housing mounted along a second edge of the at least two orthogonal edges of the shell.

8. The system of claim 6, wherein the plurality of connector housings comprises:
   a first portion of connector housings mounted to a first edge of the at least two orthogonal edges, the first portion comprising a first quantity of the plurality of connector housings that corresponds to a quantity of the one or more port cards; and
   a second portion of connector housings mounted to a second edge of the at least two orthogonal edges, the first portion comprising a second quantity of the plurality of connector housings that corresponds to a quantity of the one or more switch-fabric cards.

9. The system of claim 1, wherein:
   the one or more port cards are located in at least an upper portion of a front portion of the enclosure;
   the one or more switch-fabric cards are located in at least a center portion of the front portion of the enclosure; and
   the one or more bridge cards are located in at least a back portion of the enclosure.

10. The system of claim 9, further comprising:
    one or more additional port cards arranged along the first orientation and located in at least a bottom portion of the front portion of the enclosure; and
    one or more additional bridge cards coupling the one or more additional port cards to the one or more switch-fabric cards, the one or more additional bridge cards arranged along the third orientation and located in at least the rear portion of the enclosure.

11. An apparatus comprising:
    a shell comprising two substantially parallel surfaces;
    a plurality of connector housings mounted between the two substantially parallel surfaces;
    a plurality of connectors coupled to the plurality of connector housings, each connector configured to move along at least one axis within its respective connector housing; and
    a plurality of cables, each cable configured to couple together at least two connectors, the plurality of cables arranged between the two substantially parallel surfaces.

12. The apparatus of claim 11, wherein:
    the plurality of connector housings comprises a first portion of connector housings mounted along a first edge of at least two orthogonal edges of the shell and a second portion of connector housings mounted along a second edge the at least two orthogonal edges of the shell; and the plurality of connectors comprises:
- a first portion of connectors coupled to the first portion of connector housings and configured to be coupled to one or more port cards; and
- a second portion of connectors coupled to the second portion of connector housings and configured to be coupled to one or more switch-fabric cards.

13. The apparatus of claim 11, wherein each connector of the plurality of connectors are movable along at least two orthogonal axes.

14. The apparatus of claim 13, wherein each connector of the plurality of connectors are immovable along at least one axis.

15. The apparatus of claim 11, further comprising at least one tensioner for each of the plurality of connectors, the at least one tensioner configured to center each connector within a corresponding connector housing.

16. The apparatus of claim 15, wherein the at least one tensioner comprises at least four lever-springs located along four different sides of each connector.

17. The apparatus of claim 11, further comprising a plastic tray located between the two substantially parallel surfaces, the plastic tray configured to contain the plurality of cables.

18. The apparatus of claim 11, wherein at least one of the two substantially parallel surfaces is configured to be removed to expose the plurality of cables.

19. The apparatus of claim 11, wherein the shell is configured to fit within a rear portion of an enclosure.

20. The apparatus of claim 11, wherein the plurality of connectors comprise at least ten connectors.

* * * * *